June 28, 1932. F. E. COTTRELL 1,864,978
COMBINATION FILLER HOSE AND AUTOMATIC VALVE
Filed Oct. 31, 1930
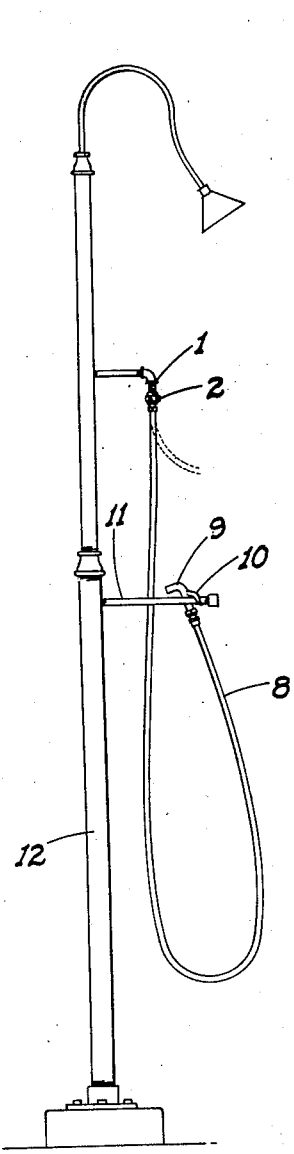
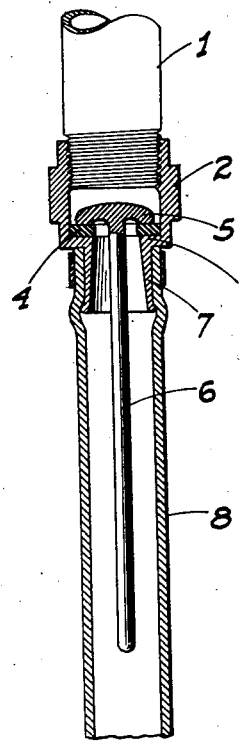
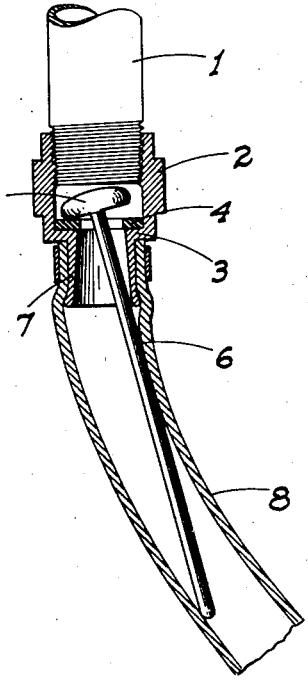
INVENTOR
F. E. Cottrell
BY
ATTORNEY Patented June 28, 1932

1,864,978

UNITED STATES PATENT OFFICE

FREDERICK E. COTTRELL, OF MODESTO, CALIFORNIA

COMBINATION FILLER HOSE AND AUTOMATIC VALVE

Application filed October 31, 1930. Serial No. 492,431.

This invention relates to valves of that type which automatically close by reason of the fluid pressure in the pipe line ahead of the valve; my principal object being to provide a valve of this general character arranged between a rigid pipe and a flexible hose in such relation to the hose that deflection of the latter adjacent the valve from a straight line will cause the valve to open.

The combination therefore is particularly adapted, and is especially intended, for use in connection with the radiator filling hoses of service stations and the like, since it enables the radiator to be filled without necessitating the use of a valve nozzle on the end of the hose and no water pressure ever remains in the hose itself. The hose therefore is not subjected to the constant strain due to internal pressure, as is the case with the present form of construction. Also a lighter and more easily manipulated hose may therefore be used, while at the same time it will wear equally as well or even longer than a heavy hose which is subjected to a constant pressure.

The combination may of course also be used for other purposes than that outlined above.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a side elevation showing an example of the manner in which the valve and hose unit may be mounted for radiator filling or service station use.

Fig. 2 is an enlarged fragmentary section of the valve and hose showing the valve closed.

Fig. 3 is a similar view showing the hose deflected and the valve opened.

Referring now more particularly to the characters of reference on the drawing the numeral 1 denotes a rigid pipe line which preferably terminates in a downwardly depending direction. On this end of the pipe is screwed a valve cage 2 which is provided intermediate its ends with an upwardly facing shoulder 3 on which a resilient gasket-ring 4 is seated. This gasket is normally engaged by the under side of a circular valve head 5 which is formed with a relatively small but long stem 6 extending through the cage in a direction away from the pipe 1.

Formed with the cage below the shoulder is a skirt or nipple portion 7, adapted to be engaged by the upper end of a length of hose 8 which is secured to the nipple by a clamp of conventional form. The other lower end of the hose is preferably fitted with a valveless nozzle 9 so that the stream of water issuing from the hose may be properly directed as may be desired. Also this nozzle is preferably provided with a hook member 10 whereby the nozzle may be hung when not in use on an arm 11 projecting from the pipe supporting standard 12, as shown in Fig. 1. The length of the hose and the relative position of its supported ends when not in use is such that the portion of the hose adjacent the valve normally hangs straight down, or so as not to engage the relatively small valve stem which projects some distance into the hose as shown in Fig. 2.

The water pressure in the pipe line ahead of the valve therefore acts on said head to maintain the same in close engagement with the gasket, so that the valve is normally closed.

In operation the vehicle whose radiator is to be filled is run within range of the hose and to fill the radiator it is only necessary to remove the nozzle from the arm 11, place said nozzle in the filler tube of the radiator and manipulate the hose so that the portion adjacent the valve is deflected to one side or the other somewhat. This will cause the bore of the hose to engage the valve stem and pull the same to one side. This will tilt the valve head on its gasket and the valve will be opened, as shown in Fig. 3. As soon as the deflecting pressure on the hose is released and it returns to its normal straight line position, the stem is likewise released and the water pressure can then again act to close the valve, as will be evident, and the flow from the nozzle will cease.

It will be noted that the skirt 7, besides serving as the means for attachment to one end of the hose, limits the lateral tilting of the valve stem. This not only prevents such excessive tilting of the stem and valve head as might interfere with the proper reseating of the valve when the side pressure on the hose is removed, but also prevents any great deflection of the hose at its junction with the skirt, and which would soon cause it to be seriously damaged.

It will also be seen that the diameter of the valve cage above the valve seat is but little greater than that of the valve head. This permits of the use of a large sized passage through the valve-seat gasket, while insuring that the valve cannot become shifted laterally at any time, subsequent to a deflecting or tilting movement of the same, sufficient to cause it to fail to fully cover the passage From the foregoing description it will be readily seen that I have produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hose and valve combination comprising a vertically disposed valve cage having a horizontal valve-seat intermediate its ends, the cage above the seat being adapted for connection to a source of fluid under pressure, a valve head normally resting on said seat, and a flexible hose secured to the cage and normally depending therefrom in axial alinement therewith, and a relatively long stem rigid with and depending from the valve head so as to project into the hose a certain distance whereby with the lateral deflection of the adjacent portion of the hose in any direction from a straight depending position, the stem will be tilted sideways and the head tilted on its seat to open the valve.

2. A structure as in claim 1 in which the valve cage is formed with a skirt below the seat to be engaged by the stem when tilted to limit the degree of tilting of the same and the deflection of the hose.

3. A structure as in claim 1, in which the diameter of the cage, above the valve head, is such relative to the diameter of the head and that of the passage through the cage that the head will always cover the passage regardless of any lateral deflection of the head while permitting of a large-diameter passage being used.

In testimony whereof I affix my signature.

FREDERICK E. COTTRELL.